Patented Sept. 12, 1922.

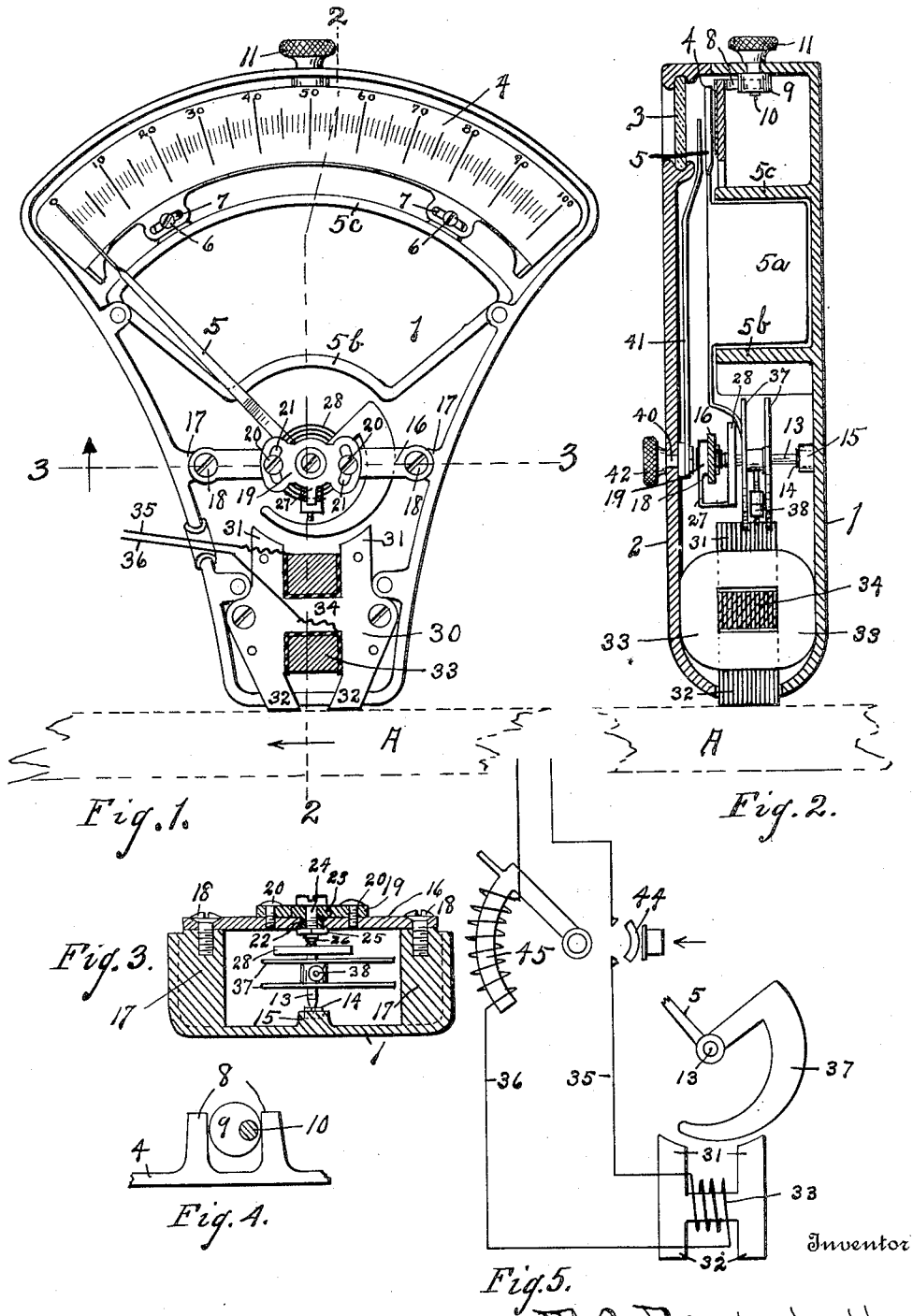

1,428,833

UNITED STATES PATENT OFFICE.

THEODORE S. BINDSCHEDLER, OF DETROIT, MICHIGAN, ASSIGNOR OF ONE-HALF TO ALVAH B. FREDERICK, OF DETROIT, MICHIGAN.

MAGNETIC BALANCE.

Application filed September 9, 1918. Serial No. 253,181.

*To all whom it may concern:*

Be it known that I, THEODORE S. BINDSCHEDLER, a citizen of Switzerland, and residing at Detroit, in the county of Wayne and State of Michigan, have invented a new and Improved Magnetic Balance, of which the following is a specification.

This invention relates to means for testing the relative penetrability to alternating magnetic flux of different materials to determine the relative hardness of such materials and its object is to provide an instrument which will quickly and certainly indicate such relative penetrability, which will be simple in construction and may be of such size that it can be conveniently carried around by hand.

This invention consists primarily in an electro-magnetic balance having testing and indicating circuits and an indicator operatively influenced by the magnetic flux in the indicating circuit whenever the instrument is connected to a source of alternating current, which balance will be varied by the introduction of a material to be tested into the testing circuit. It also consists in so constructing the electro-magnetic balance that it will contain a plurality of air gaps, and in mounting an indicator-operating armature in one of the air gaps. It also consists in providing an instrument of this character with proper adjusting devices and with means for regulating the magnetic flux at the air gaps by means of electric resistance or reactance or both. It further consists in the details of construction shown in the accompanying drawing and particularly pointed out in the claims.

The degree of penetrability is a measure of hardness, and the instrument will be usually employed to determine the hardness of the material, parts or products being tested, magnetic characteristics of the materals not being considered.

In the accompanying drawing, Fig. 1 is an elevation of this improved instrument with the cover removed. Figs. 2 and 3 are sections on the lines 2—2 and 3—3 of Fig. 1 respectively. Fig. 4 is a detail of one of the adjusting devices. Fig. 5 is a diagram of one of the circuits which may be employed.

Similar reference characters refer to like parts throughout the several views.

This instrument preferably has a back 1 and a front 2 provided with a window 3 through which the graduated segment 4 and the movable pointer 5 can be seen. The segment 4 may be held adjustably in position by screws 6 passing through slots 7 in the segment and the segment has two lugs 8 extending rearwardly between which the cam 9 engages. This cam is mounted on a small shaft 10 having a knob 11 on its outer end by means of which the cam may be turned and the segment moved either way circumferentially. A plate or fan $5^a$ may be secured to the pointer 5 and move between the walls $5^b$ and $5^c$ on the back 1 in order to slow down or dampen the movements of the pointer.

The pointer 5 is mounted on a rotatable pintle 13 whose rear end is mounted in a jewel 14 in a socket 15 on the back 1. The cross bar 16 is secured to two lugs 17 on the back 1 by means of screws 18 and to this cross bar the small plate 19 is secured by screws 20 that extend through slots 21 in this plate. This plate is centered on the collar 23 of a bushing 22 seated in the cross bar and a screw 24 is held in the center of this bushing by means of a nut 25. A jewel 26 mounted on the inner end of the screw constitutes the front bearing of the pintle 13. A small arm 27 extends down from the plate 19 and engages the outer end of the hair spring 28 whose inner end is secured to the pintle 13. The tension of the spring may be varied by swinging the arm 27.

Secured to the back is an H-shaped magnet 30, which may be laminated, having upper poles 31 and lower poles 32. A coil 33 is wound on the cross-bar 34 of the magnet and wires 35 and 36 lead to a current source. Secured to the pintle 13 are two armatures 37 of iron which tend to swing the pointer 5 to the right against the tension of the hair spring 28 when the magnet is energized. As indicated in Fig. 5 these armatures are preferably tapering segments and connected at the large ends to the pintle, the distance from the pintle to the outer edge of the segment preferably diminishing from the point of attachment.

They are preferably of even thickness throughout. One of these armatures may be found sufficient under some conditions. A small adjustable weight 38 counterbalances these armatures and the pointer 5.

If desired, a small shaft 40 may be mounted in the front plate and carry the hand 41 and button 42 at its ends. This hand may be positioned to indicate a normal position of the pointer 5. A switch 44 will be connected into one of the wires leading to the coil 33 and a reactance 45 may also be connected into one of these wires. This reactance also incorporates a resistance. This reactance is to compensate for the varying voltages of supply circuits so that instruments with standard windings 33 may be employed with currents of different voltages. This reactance is also of value when the instrument is used to test irregular or curved surfaces when the reactance is adjusted to position the indicator while a standard test piece of such irregular or curved shape is applied to the poles. Any number of similar shapes may now be tested to determine their hardness.

A test-piece which represents a standard of hardness or of mixture and therefore of penetrability and which will be furnished with the instrument will be placed across the poles 32. This test-piece will be marked to correspond to one of the indications on the scale 4, say 70. If now the proper alternating current is passed over the winding 33, the pointer 5 will swing to 70. If it does not, the dial 4 may be moved by turning the knob 11 or the current may be modified by means of the reactance 45. In other words, a magnetic balance is established. The hand 41 may be turned to the graduation desired in order to render easier the reading of the instrument.

If now the test-piece is removed from the poles 32 and a piece of work A is substituted, unless this piece of work has the same hardness as the test-piece, the pointer 5 will swing toward one side or the other of the hand 41 and of the indication 70, showing that another magnetic balance is established. In all cases, the pointer 5 will indicate a relation between the penetration of the alternating magnetic flux in the test bar and in the materials being tested. The instrument may be moved back and forth over the entire surface to be tested and the magnetic balance will vary with the penetrability to the alternating magnetic flux and therefore with the hardness of the material being tested. When the device is in operation two circuits of magnetic flux are established. One of these circuits is constituted by the object being tested, the two poles 32 and the cross bar 34 of the magnet, and may be termed the testing circuit, while the other circuit is constituted by the armature 37, the two poles 31 and the cross bar 34 and may be termed the indicating circuit.

The hardness of each square or linear inch of large tempered steel dies can be easily compared to the hardness of a test bar by means of this instrument, and the homogeneity of the metal of railway rails and other manufactures may be quickly determined with great precision. The measuring circuit including the poles 31 varies instantly with any change in the testing circuit which includes the poles 32, and more ready penetration of the magnetic flux into the object being tested will result in a diminution of the alternating magnetic flux in the measuring circuit and less movement of the pointer 5.

The poles 32 need not be placed in actual contact with the articles to be tested as the instrument will operate substantially as well when entirely free from the work. However, the air gap between the poles and the material being tested must always remain constant.

Many modifications in the sizes and details of this construction may be made by those skilled in the electric art without departing from the spirit of my invention as set forth in the following claims.

I claim:—

1. An electric testing instrument for determining the penetration of alternating magnetic flux through materials to be tested comprising two iron poles and a bar between them integral therewith and a coil to receive alternating current wound on said bar, and means embodying an armature whose position is affected by the magnetic flux for indicating such penetration.

2. Means for determining the penetration of magnetic flux through materials to be tested comprising a substantially H-shaped electro-magnet having its coil wound on the central bar to receive alternating current, the work to be tested being placed adjacent the air gap between two poles, and an indicator mounted adjacent the air gap of the other two poles.

3. An electro-magnetic testing instrument comprising a case, an electro-magnet mounted therein and comprising an H-shaped core and a coil mounted on its cross-bar to receive alternating current, two of the poles extending from the case, a pintle pivotally mounted adjacent the other two poles, an armature on the pintle adapted to be swung when the coil is energized, a pointer connected to the pintle, and means to resist the action of the armature.

4. An electro-magnetic testing instrument comprising a case, an electro-magnet mounted therein and comprising an H-shaped core and a coil mounted thereon, two of the poles of the core extending from the case, a pintle rotatably mounted adjacent the core, an armature on the pintle adapted to be swung when the coil is energized, a spring to resist the movement of the pintle, a pointer mounted on the pintle and a graduated segment over which the pointer may be swung by the armature.

5. An electro-magnetic testing instrument comprising a case, an electro-magnet mounted therein and comprising an H-shaped core and a coil for alternating current mounted thereon, two of the poles of the core extending from the case, a pintle rotatably mounted adjacent the core, an armature on the pintle adapted to be swung when the coil is energized, a spring to resist the movement of the pintle, a pointer mounted on the pintle and a graduated segment over which the pointer may be swung by the armature, means to vary the tension of said spring and means to adjust said segment.

6. An electro-magnetic testing instrument comprising a case having a window, an electro-magnet mounted therein and comprising an H-shaped core and a coil for alternating current mounted thereon, a pintle rotatably mounted adjacent said magnet, an armature for the magnet mounted on the pintle and adapted to be swung by the magnet when it is energized, a hair-spring mounted on the pintle and an adjustable arm connected to one end of said spring to vary its tension, a graduated scale mounted in the case adjacent the window therein, a pointer on the pintle adapted to swing across said scale and window, and a hand pivotally mounted in said case and adapted to be manually swung across said window.

7. A magnetic balance comprising a two pole core having a reduced portion connecting the poles and a coil mounted on the reduced portion to receive alternating current, the work to be tested being placed adjacent the air gap between the two poles, an armature mounted adjacent the core so as to be affected by the magnetic flux adjacent the core, and an indicator rigid with the armature.

8. Means for determining the penetration of alternating magnetic flux through materials to be tested, comprising two iron poles and a coil, means for conducting alternating current to said coil, and means mounted adjacent said poles and affected by the electrical conditions in the air gap between the poles for indicating said penetration.

9. Means for determining the penetration of magnetic flux through materials to be tested comprising a substantially H-shaped electro-magnet having its coil wound on the central bar to receive alternating current, the work to be tested being placed adjacent the air gap between two poles so as to constitute a path for magnetic flux, and an indicator influenced by the varying magnetic flux at the other two poles, said pairs of poles when alternating current passes through said coil constituting an electromagnetic balance.

THEODORE S. BINDSCHEDLER.